(12) United States Patent
Garcia Reyero Vinas et al.

(10) Patent No.: US 9,936,100 B2
(45) Date of Patent: Apr. 3, 2018

(54) PROCESS IMAGE DATA

(71) Applicant: HEWLETT-PACKARD DEVELOPMENT COMPANY, L.P., Houston, TX (US)

(72) Inventors: Juan Manuel Garcia Reyero Vinas, Barcelona (ES); Jan Morovic, Colchester (GB); Peter Morovic, Sant Cugat del Valles (ES); Lluis Abello Rosello, Tarragon (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/128,511

(22) PCT Filed: Mar. 31, 2014

(86) PCT No.: PCT/US2014/032353
§ 371 (c)(1),
(2) Date: Sep. 23, 2016

(87) PCT Pub. No.: WO2015/152870
PCT Pub. Date: Oct. 8, 2015

(65) Prior Publication Data
US 2017/0111546 A1    Apr. 20, 2017

(51) Int. Cl.
*H04N 1/405* (2006.01)
*H04N 1/60* (2006.01)
*B41J 29/38* (2006.01)

(52) U.S. Cl.
CPC ......... *H04N 1/4052* (2013.01); *B41J 29/38* (2013.01); *H04N 1/6086* (2013.01)

(58) Field of Classification Search
None
See application file for complete search history.

(56) References Cited

U.S. PATENT DOCUMENTS

| | | | |
|---|---|---|---|
| 5,189,528 A * | 2/1993 | Takashima | H04N 1/4076 348/E5.081 |
| 5,375,197 A | 12/1994 | Kang | |
| 5,767,978 A | 6/1998 | Revankar et al. | |
| 7,564,585 B2 * | 7/2009 | Berkner | H04N 1/405 358/1.9 |
| 9,706,358 B2 * | 7/2017 | Sen | G01S 11/06 |

(Continued)

FOREIGN PATENT DOCUMENTS

| | | |
|---|---|---|
| JP | 2001157056 | 6/2001 |
| KR | 20040106406 | 12/2004 |
| KR | 20080043265 | 5/2008 |

OTHER PUBLICATIONS

Bukhari, et al. Improved Document Image Segmentation Algorithm using Multiresolution Morphology. Technical University of Kaiserslautern. Nov. 12, 2010.

*Primary Examiner* — Madelein Nguyen
(74) *Attorney, Agent, or Firm* — HP Inc. Patent Department (57) ABSTRACT

A printing system and method to process image data is disclosed. The printing system includes an identification module and image pipeline module include a linear threshold array algorithm and a halftoning algorithm to process the image data. An image pipeline module applies a linear threshold array algorithm to line regions and a halftoning algorithm to the non-line regions.

18 Claims, 5 Drawing Sheets

(56) References Cited

U.S. PATENT DOCUMENTS

| | | | |
|---|---|---|---|
| 2002/0067509 A1* | 6/2002 | Roylance | G06K 15/02 358/2.1 |
| 2004/0027614 A1 | 2/2004 | Li | |
| 2007/0139714 A1 | 6/2007 | McElvain | |
| 2008/0018938 A1 | 1/2008 | Lee | |
| 2008/0111681 A1* | 5/2008 | Rathbone | G06K 7/10009 340/540 |
| 2008/0260273 A1* | 10/2008 | Ito | G06T 9/005 382/245 |
| 2009/0161165 A1* | 6/2009 | Fujimoto | G06K 15/107 358/2.1 |
| 2009/0208126 A1* | 8/2009 | Matsumoto | H04N 19/60 382/244 |
| 2010/0182621 A1* | 7/2010 | Yamada | H04N 1/4058 358/1.9 |
| 2011/0181035 A1* | 7/2011 | Kiuchi | B42D 15/0073 283/72 |
| 2011/0193334 A1* | 8/2011 | Kiuchi | B41M 3/14 283/72 |
| 2011/0222124 A1 | 9/2011 | Kuno | |
| 2012/0106835 A1* | 5/2012 | Bernal | H04N 1/52 382/162 |
| 2012/0170849 A1* | 7/2012 | Saka | G06K 9/346 382/195 |
| 2013/0069968 A1 | 3/2013 | Lee et al. | |
| 2013/0135637 A1* | 5/2013 | Ohira | G06T 5/002 358/1.9 |
| 2013/0155466 A1 | 6/2013 | Shiraishi | |
| 2013/0168138 A1* | 7/2013 | Yamazaki | H05K 1/0296 174/253 |
| 2013/0182028 A1* | 7/2013 | Kuiper | B41J 2/07 347/12 |
| 2015/0062233 A1* | 3/2015 | Ueshima | B41J 2/16579 347/19 |
| 2016/0004942 A1* | 1/2016 | Sumi | H04N 1/4051 358/3.06 |
| 2016/0072982 A1* | 3/2016 | Muraishi | H04N 1/58 358/2.1 |
| 2016/0255240 A1* | 9/2016 | Morovic | H04N 1/405 |
| 2016/0266512 A1* | 9/2016 | Haruta | G03G 15/043 |

* cited by examiner

$$\begin{array}{ccc} -1 & -1 & -1 \\ -1 & 8 & -1 \\ -1 & -1 & -1 \end{array}$$

*Fig.4A*

$$\begin{array}{ccccc} 1 & 0 & 0 & 0 & 1 \\ 2 & 1 & 0 & 1 & 2 \\ 4 & 4 & 4 & 4 & 4 \\ 2 & 1 & 0 & 1 & 2 \\ 1 & 0 & 0 & 0 & 1 \end{array}$$

*Fig.4B*

$$\begin{array}{ccccc} 1 & 2 & 4 & 2 & 1 \\ 0 & 1 & 4 & 1 & 0 \\ 0 & 0 & 4 & 0 & 0 \\ 0 & 1 & 4 & 1 & 0 \\ 1 & 2 & 4 & 2 & 1 \end{array}$$

PROCESS IMAGE DATA

BACKGROUND

Printing system may include fluid applicators and image pipeline modules. The image pipeline module may process image data to transform continuous tone image data to halftone image data. The fluid applicator device may apply printing fluid to a substrate to form an image based on the halftone image data.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

FIG. 6 is a block diagram illustrating a computing device such as a printing system including a processor and a non-transitory, computer-readable storage medium to store instructions to operate the printing system according to an example.

DETAILED DESCRIPTION

A printing system may include an image pipeline module to process image data and a fluid applicator to apply printing fluid to a substrate to form an image thereon. The image may be based on the image data processed by the image pipeline module of the printing system. The image pipeline module, for example, may transform continuous tone image data to halftone image data. The image pipeline module, however, may process the image data with a same halftoning algorithm such as an error diffusion algorithm or a array-based algorithm. However, application of the same halftoning algorithm to different image types may not provide enhancement to the various image types. For example, the halftoning algorithm may produce enhanced graphic image types, but not produce enhanced line renderings. That is, error diffusion algorithms may tend to lose and confuse lines. Also, array-based algorithms may tend to produce noisy, lower quality lines. Thus, certain image types may not be enhanced by application of the same halftoning algorithm.

In examples, a printing system includes an identification module and an image pipeline module. The identification module identifies line regions of an image corresponding to lines based on image data. The identification module also identifies non-line regions of the image corresponding to image portions without lines based on the image data. The image pipeline module includes a linear threshold array algorithm and a halftoning algorithm to process the image data. The image pipeline module applies the linear threshold array algorithm to the line regions and the halftoning algorithm to the non-line regions to form filtered image data. Accordingly, different algorithms applied to the different image types provide enhancement to the various image types. Thus, lines as well as graphics of the image may be enhanced.

Figure 1:
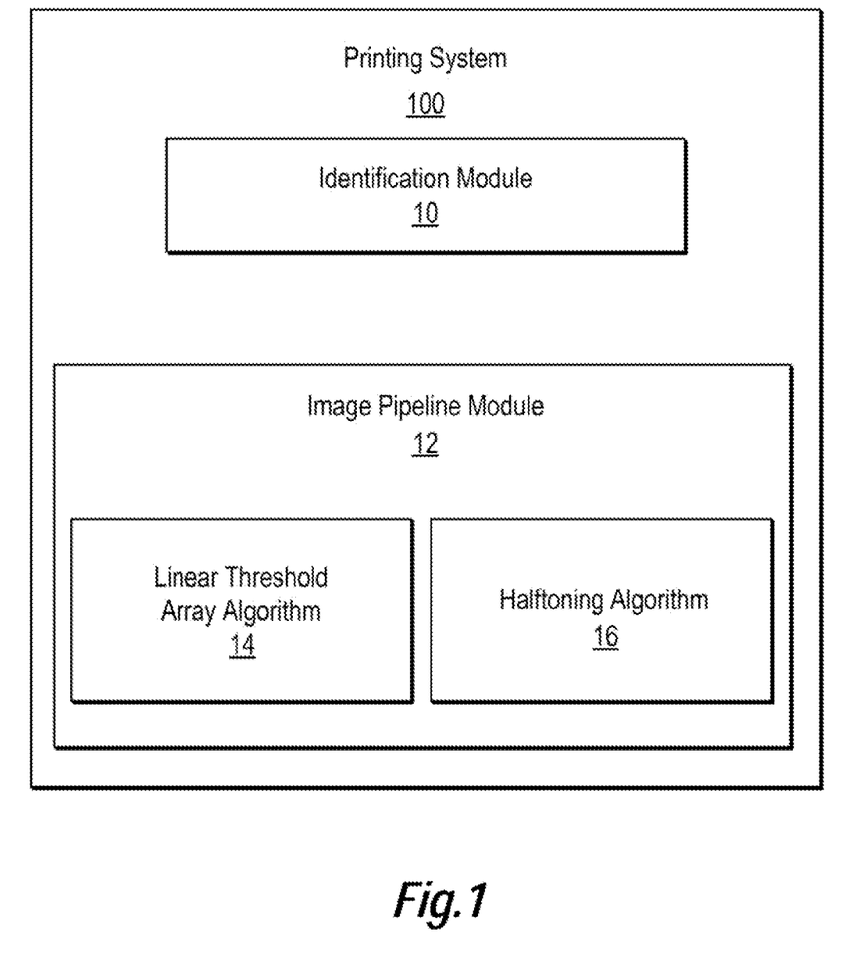
FIG. 1 is a block diagram illustrating a printing system according to an example.

FIG. 1 is a block diagram illustrating a printing system according to an example. Referring to FIG. 1, a printing system 100 includes an identification module 10 and an image pipeline module 12. The identification module 10 identifies line regions of an image corresponding to lines based on image data. The identification module 10 also identifies non-line regions of the image corresponding to image portions without lines based on the image data. The image pipeline module 12 includes a linear threshold array algorithm 14 and a halftoning algorithm 16 to process the image data.

Referring to FIG. 1, the image pipeline module 12 may halftone the line regions independently from the non-line regions of the image. For example, the image pipeline module 12 applies the linear threshold array algorithm 14 to the line regions. The image pipeline module 12 also applies the halftoning algorithm 16 to the non-line regions to form filtered image data. In some examples, the halftoning algorithm 16 may include at least one of an error diffusion algorithm and an array-based algorithm.

In some examples, the identification module 10 and the image pipeline module 12 may be implemented in hardware, software including firmware, or combinations thereof. The firmware, for example, may be stored in memory and executed by a suitable instruction-execution system. If implemented in hardware, as in an alternative example, the identification module 10 and the image pipeline module 12 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In other examples, the identification module 10 and the image pipeline module 12 may be implemented in a combination of software and data executed and stored under the control of a computing device.

Figure 2:
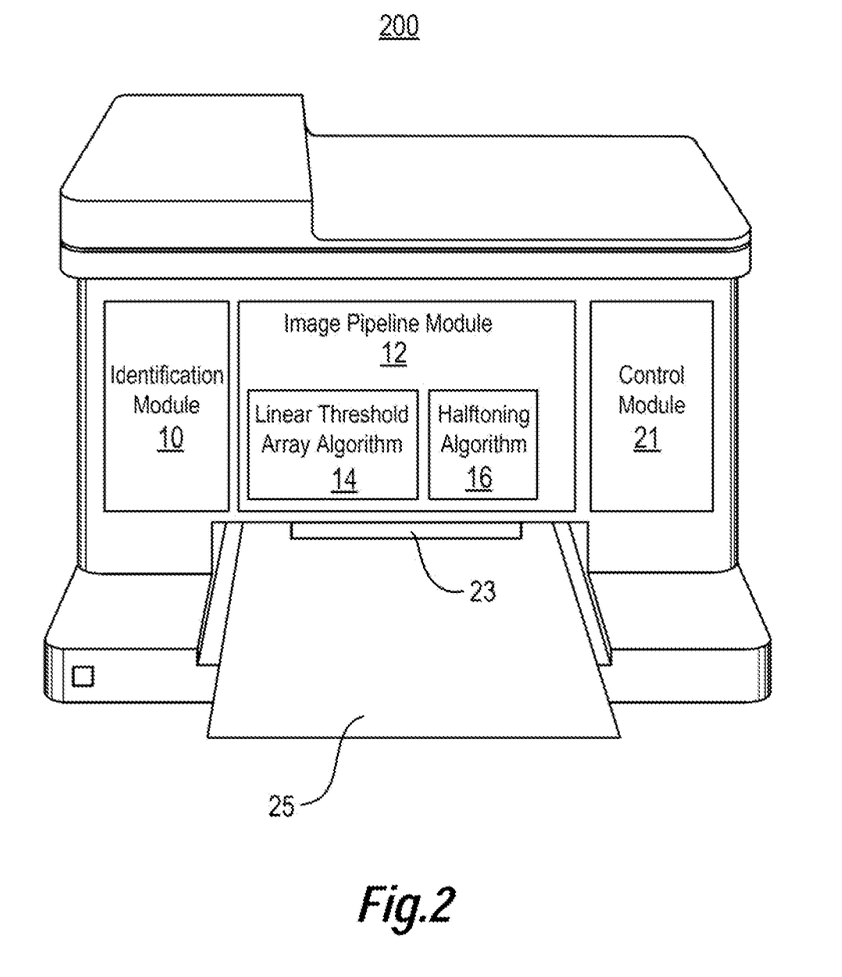
FIG. 2 is a perspective view illustrating a printing system according to an example.
Figure 3:
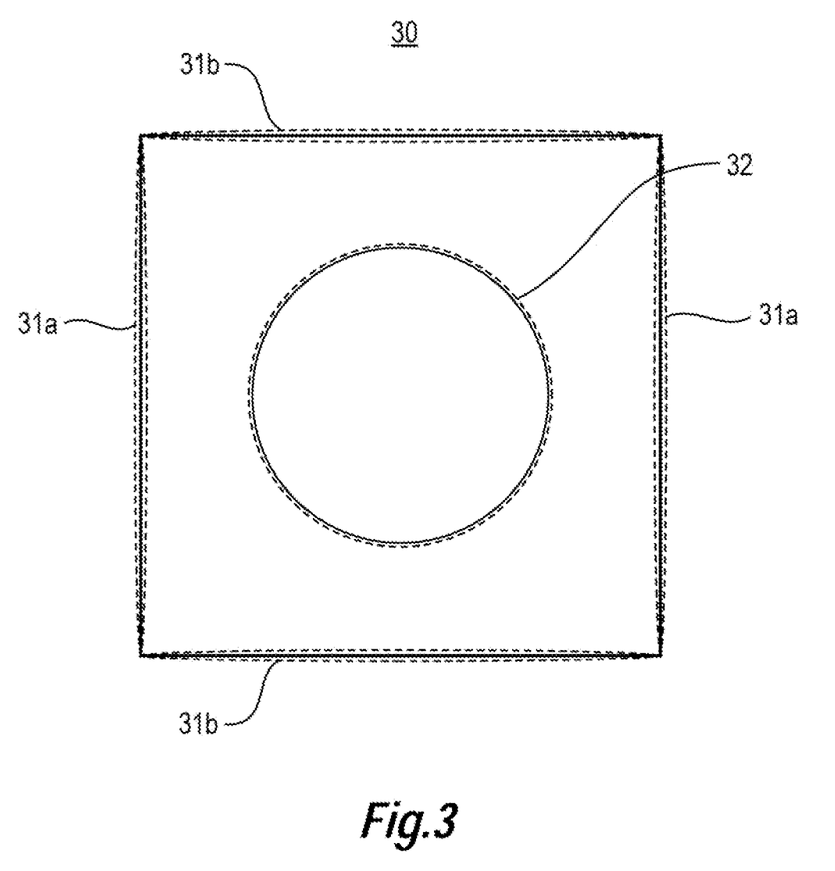
FIG. 3 is a top view illustrating an image corresponding to image data processed by the printing system of FIG. 2 according to an example.
Figure 4A:
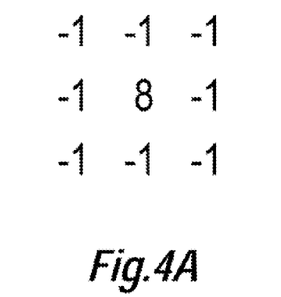
FIGS. 4A-4C are representational views of a Laplacian array, a first filter array, and a second filter array, respectively of the printing system of FIG. 2 according to examples.
Figure 4B:
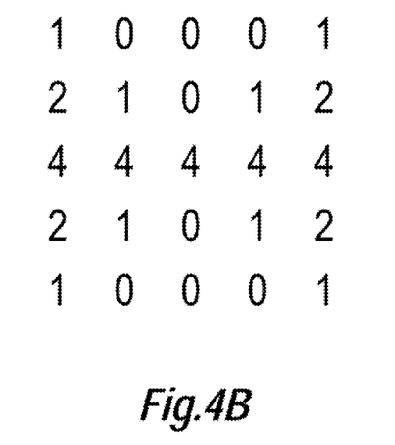
Figure 4C:
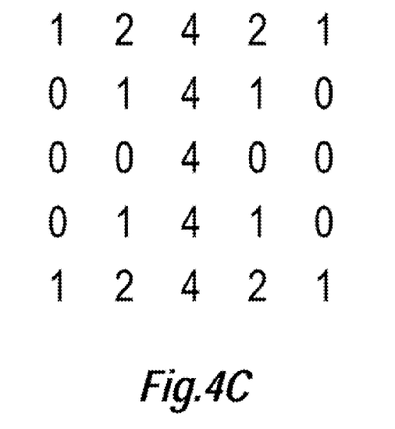

FIG. 2 is a perspective view illustrating a printing system according to an example. FIG. 3 is a top view illustrating an image corresponding to image data processed by the printing system of FIG. 2 according to an example. FIGS. 4A-4C are representational views of a Laplacian array, a first filter array, and a second filter array, respectively of the printing system of FIG. 2 according to examples. The printing system 200 may include the identification module 10 and the image pipeline module 12 previously discussed with respect to the printing system 100 of FIG. 1. Referring to FIG. 2, in some examples, the printing system 200 may also include a control module 21 and a fluid applicator 23. The control module 21 combines the filtered image data and the image data to form an enhanced image data. The fluid applicator 23 applies printing fluid to a substrate 25 to form a printed image based on the enhanced image data. In some examples, the fluid applicator device 23 may include a printhead, printhead modules, a printbar, and/or a printhead assembly, and the like. The printing system 200, for example, may include an inkjet printer and the fluid applicator unit 23 may include an inkjet printhead.

Referring to FIGS. 2-4, in some examples, the identification module 10 may perform a convolution of a Laplacian including a Laplacian array (e.g., Laplacian kernel) 41, a convolution of a first filter array 42, and a convolution of a second filter array 43. In some examples, the Laplacian array 41 may include a 3 by 3 array as illustrated in FIG. 4A, the first filter array 42 may include a 5 by 5 array as illustrated in FIG. 4B, and the second filter array 43 may include a 5 by 5 array as illustrated in FIG. 4C. In some examples, the first and second filter arrays 42 and 43 may be combined into a combined filter array.

The Laplacian is a two dimensional (2-D) isotropic measure of a 2nd spatial derivative of an image 30. That is, the Laplacian is an example of a second order or second derivative method of enhancement. For example, the Laplacian of an image with pixel intensity values I(x,y) is given by: Equation 1 below:

$$L(x, y) = \frac{\partial^2 I}{\partial x^2} + \frac{\partial^2 I}{\partial y^2} \qquad \text{Equation 1}$$

The Laplacian of the image 30 may be used to highlight regions of rapid intensity change thereof. The Laplacian may be implemented as a convolution between a respective image 30 and a Laplacian array. Convolution is a mathematical operation to multiply together two arrays of numbers to produce a third array of numbers. The convolution is performed by shifting the respective Laplacian array over the image 30.

The respective Laplacian array may move through all, the positions where the Laplacian array fits within the boundaries of the image 30. Each array position (e.g., cell) may correspond to a single output pixel having a value which is calculated by multiplying the array value and the underlying image pixel value. In other words, during convolution, the respective Laplacian array is centered on a respective pixel of the image 30 to replace a corresponding pixel value with a sum of the Laplacian array multiplied by the pixel value. In some examples, negative values may be replaced with zeros. After convolution, only respective cells in a threshold value range may be identified as a line. For example, the threshold value range may be 0.4 to 0.7. Subsequently, each, of the resultant calculated numbers of the cells may be added together.

Referring to FIGS. 2-4, in some examples, identification of line regions 31a and 31b corresponding to lines of an image 30 represented by image data may include identifying vertical line regions 31a and horizontal line regions 31b. For example, the horizontal line regions 31b correspond to horizontal lines of the image 30. The horizontal line regions 31b may be identified by performing a convolution of a first filter array 44. Additionally, the vertical line regions 31a correspond to horizontal lines of the image 30. The horizontal line regions 31b may be identified by performing a convolution of a second filter array 43. In some examples, the respective convolutions to determine the horizontal and vertical line regions 31b and 31a may be performed on an edge image. Additionally, pixels in which the convolution of the first filter array 42 (e.g., horizontal convolution) is greater than the convolution of the second filter array 43 (e.g., vertical convolution) may correspond to horizontal line regions 31b and pixels in which the vertical convolution is greater than the horizontal convolution may correspond to vertical line regions 31a. Alternatively, a single convolution of a combined filter array (e.g., including the first and second filter array) may be used to determine both the horizontal line region 31b and vertical line region 31a.

Referring to FIGS. 2-4, in some examples, the image pipeline module 12 may halftone the line regions 31a and 31b independently from the non-line regions 32 of the image 30. For example, the image pipeline module 12 applies the linear threshold array algorithm 14 to the line regions 31a and 31b. In some examples, the linear threshold array algorithm 14 is applied to the vertical line regions 31a of the image 30 to form filtered vertical line regions to be vertically tiled on top of the image 30. Additionally, the linear threshold array algorithm 14 is applied to the horizontal line regions 31b of the image 30 to form filtered horizontal line regions to be horizontally tiled on top of the image 30. In some examples, a set of regular and smooth dots are used to render an impression of a continuous line. Additionally, in some examples, empty pixels may be uniformly distributed over the lines based on a required percentage of white pixels.

Referring to FIGS. 2-4, in some examples, the image pipeline module 12 also applies the halftoning algorithm 16 to the non-line regions 32 to form filtered image data. The halftoning algorithm 16 may include an error diffusion algorithm and/or an array-based algorithm. The control module 21 may combine the filtered image data and the image data to form an enhanced image data. Thus, the filtered image data is added back into the original image data to enhance the image 30. In some examples, the filtered data may be scaled to correspond to the dimension of the original image 30. The fluid applicator 23 applies printing fluid to a substrate 25 to form the enhanced image based on the image data processed by the image pipeline module 12.

Figure 5:
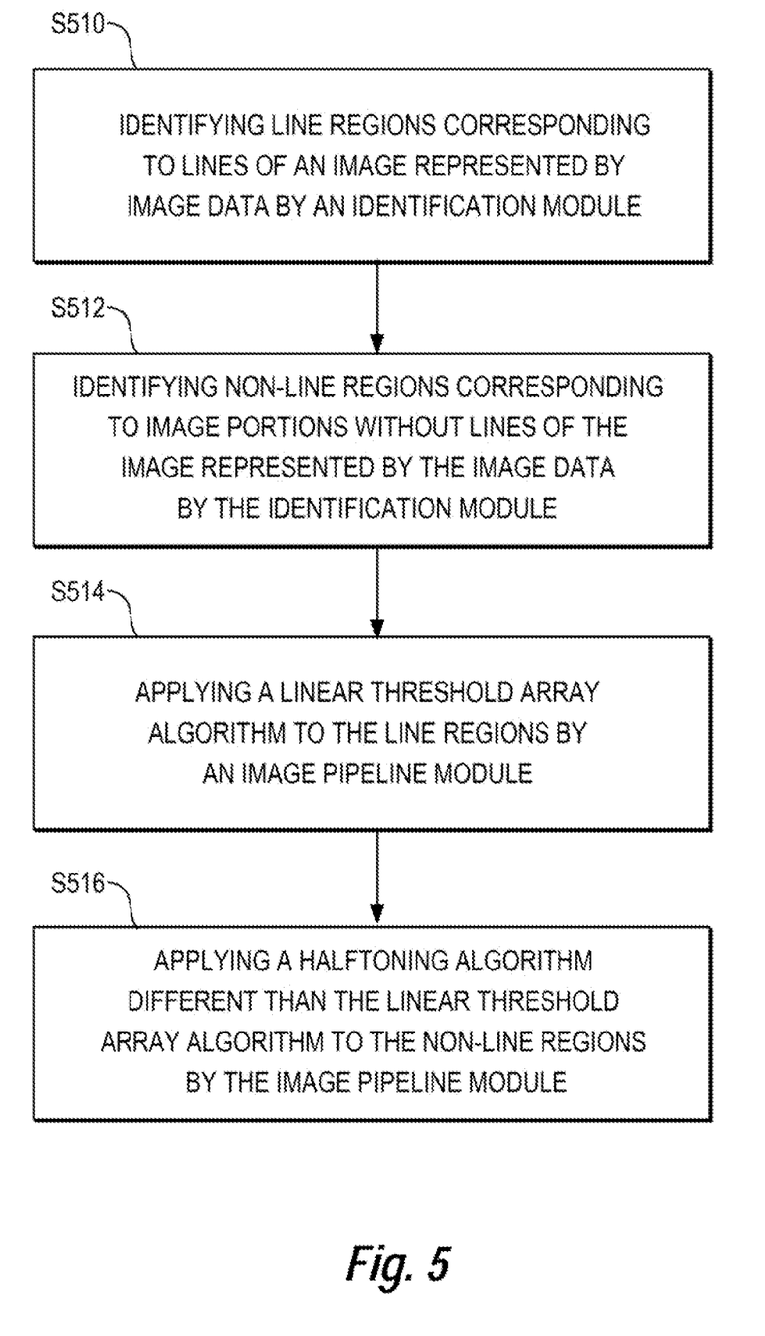
FIG. 5 is a flowchart illustrating a method of processing image data according to an example.

FIG. 5 is a flowchart illustrating a method of processing image data according to an example. Referring to FIG. 5, in block S510, line regions corresponding to lines of an image represented by image data are identified by an identification module. For example, a convolution of a Laplacian including a Laplacian array may be performed. The Laplacian array may include a 3 by 3 array. In some examples, the horizontal line regions correspond to horizontal lines of the image and may be identified by performing a convolution of a first filter array. Additionally, in some examples, the vertical line regions correspond to vertical lines of the image and may be identified by performing a convolution of a second filter array. The first and second filter arrays may include a 5 by 5 array. Alternatively, a single convolution of a combined filter array (e.g., including the first and second filter array) may be used to determine both the horizontal line region and vertical line region. In block S512, non-line regions corresponding to image portions without lines of the image represented by the image data are identified by the identification module.

In block S514, a linear threshold array algorithm is applied to the line regions by an image pipeline module. The image pipeline module may halftone the line regions independently from the non-line regions of the image. For example, the linear threshold array algorithm is applied to the vertical line regions of the image to form filtered vertical line regions to be vertically placed on the image. Additionally, the linear threshold array algorithm is applied to the horizontal line regions of the image to form filtered horizontal line regions to be horizontally placed on the image. In block S516, a halftoning algorithm different than the linear threshold array algorithm is applied to the non-line regions by the image pipeline module. In some examples, the halftoning algorithm includes at least one of an error diffusion algorithm and an array-based algorithm.

A computing device such as a printing system can include a processor and a non-transitory, computer-readable storage medium to store instructions to operate the printing system according to an example. In some examples, the non-transitory, computer-readable storage medium may be included in a computing device such as a printing system. In some examples, the non-transitory, computer-readable storage medium may be implemented in whole or in part as instructions such as computer-implemented instructions stored in the computing device locally or remotely, for example, in a server or a host computing device considered herein to be part of the printing system.

In some examples, the non-transitory, computer-readable storage medium may correspond to a storage device that stores instructions, such as computer-implemented instructions and/or programming code, and the like. For example, the non-transitory, computer-readable storage medium may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Examples of storage devices include, but are not limited to, hard disk drives, compact disc drives, digital versatile disc drives, optical drives, and flash memory devices. In some examples, the non-transitory, computer-readable storage medium may even be paper or another suitable medium upon which the instructions are printed, as the instructions can be electronically captured, via, for instance, optical scanning of the paper or other medium, then compiled, interpreted or otherwise processed in a single manner, if necessary, and then stored therein. A processor generally retrieves and executes the instructions stored in the non-transitory, computer-readable storage medium, for example, to operate a computing device such as the printing system. In an example, the non-transitory, computer-readable storage medium can be accessed by the processor.

It is to be understood that the flowchart of FIG. 5 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 5 illustrates a specific order of execution, the order of execution may differ from that which is depicted. For example, the order of execution of two or more blocks may be rearranged relative to the order illustrated. Also, two or more blocks illustrated in succession in FIG. 5 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A printing system, comprising:
an identification module to identify line regions of an image corresponding to lines based on image data, and to identify non-line regions of the image corresponding to image portions without lines based on the image data; and
an image pipeline module including a linear threshold array algorithm and a halftoning algorithm to process the image data, the image pipeline module to apply the linear threshold array algorithm to the line regions and to apply the halftoning algorithm to the non-line regions to form filtered image data,
wherein the printing system forms an image of the filtered image data on a substrate.

2. The printing system of claim 1, further comprising:
a control module to combine the filtered image data and the image data to form an enhanced image data.

3. The printing system of claim 2, further comprising:
a fluid applicator to apply printing fluid to a substrate to form a printed image based on the enhanced image data.

4. The printing system of claim 1, wherein the identification module is configured to perform a convolution of a Laplacian including a Laplacian array.

5. The printing system of claim 1, wherein the image pipeline module is configured to halftone the line regions independently from the non-line regions of the image.

6. The printing system of claim 1, wherein the halftoning algorithm comprises at least one of an error diffusion algorithm and an array-based algorithm.

7. The printing system of claim 1, wherein the imaging pipeline module is to apply the linear threshold array algorithm to just the line regions.

8. The printing system of claim 1, wherein the imaging pipeline is to apply the half-toning algorithm to just the non-line regions to form the filtered image data.

9. The printing system of claim 1, wherein the imaging pipeline is to apply the linear threshold array algorithm to just the line regions and is to apply the half-toning algorithm to just the non-line regions to form the filtered image data.

10. A method of processing image data, the method comprising:
identifying line regions corresponding to lines of an image represented by image data by an identification module;
identifying non-line regions corresponding to image portions without lines of the image represented by the image data by the identification module;
applying a linear threshold array algorithm to the line regions by an image pipeline module;
applying a halftoning algorithm different than the linear threshold array algorithm to the non-line regions by the image pipeline module; and
printing the image of the image data after the linear threshold array and the halftoning algorithms have been applied.

11. The method of claim 10, wherein the identifying line regions corresponding to lines of an image represented by image data by an identification module comprises:
performing a convolution of a Laplacian including a Laplacian array.

12. The method of claim 10, wherein the identifying line regions corresponding to lines of an image represented by image data by an identification module comprises:
   identifying horizontal line regions corresponding to horizontal lines of the image; and
   identifying vertical line regions corresponding to vertical lines of the image.

13. The method of claim 12, wherein the identifying horizontal line regions corresponding to horizontal lines of the image comprises:
   performing a convolution of a first filter array.

14. The method of claim 12, wherein the identifying vertical line regions corresponding to vertical lines of the image comprises:
   performing a convolution of a second filter array.

15. The method of claim 12, wherein the applying a linear threshold array algorithm to the line regions further comprises:
   applying the linear threshold array algorithm to the horizontal line regions of the image to form filtered horizontal line regions to be horizontally placed on the image; and
   applying the linear threshold array algorithm to the vertical line regions of the image to form filtered vertical line regions to be vertically placed on the image.

16. The method of claim 10, wherein the halftoning algorithm comprises at least one of an error diffusion algorithm and an array-based algorithm.

17. The method of claim 10, wherein the applying a linear threshold array algorithm to the line regions by an image pipeline module further comprises:
   halftoning the line regions independently from the non-line regions of the image.

18. A non-transitory computer-readable storage medium having computer executable instructions stored thereon to operate a printing system, the instructions are executable by a processor to:
   identify line regions corresponding to lines of an image represented by image data by an identification module;
   identify non-line regions corresponding to image portions without lines of the image represented by the image data by the identification module;
   apply a linear threshold array algorithm to the line regions by an image pipeline module;
   apply a halftoning algorithm different than the linear threshold array algorithm to the non-line regions by the image pipeline module;
   combine the filtered image data and the image data to form an enhanced image data; and
   instruct fluid applicator to apply printing fluid to a substrate to form a printed image based on the enhanced image data.

\* \* \* \* \*

UNITED STATES PATENT AND TRADEMARK OFFICE
CERTIFICATE OF CORRECTION

| | | |
|---|---|---|
| PATENT NO. | : 9,936,100 B2 | Page 1 of 1 |
| APPLICATION NO. | : 15/128511 | |
| DATED | : April 3, 2018 | |
| INVENTOR(S) | : Juan Manuel Garcia Reyero Vinas et al. | |

It is certified that error appears in the above-identified patent and that said Letters Patent is hereby corrected as shown below:

On the Title Page

In item (72), Inventors, in Column 1, Line 5, delete "Tarragon" and insert -- Tarragona --, therefor.

Signed and Sealed this
Twenty-first Day of August, 2018

Andrei Iancu
*Director of the United States Patent and Trademark Office*